(12) United States Patent
Liu et al.

(10) Patent No.: US 12,117,597 B2
(45) Date of Patent: Oct. 15, 2024

(54) ZOOM LENS AND OPTICAL DEVICE HAVING THE SAME

(71) Applicant: ZHEJIANG DAHUA TECHNOLOGY CO., LTD., Zhejiang (CN)

(72) Inventors: Kai Liu, Hangzhou (CN); Faguan Lin, Hangzhou (CN); Hongxing Ding, Hangzhou (CN)

(73) Assignee: ZHEJIANG DAHUA TECHNOLOGY CO., LTD., Hangzhou (CN)

(*) Notice: Subject to any disclaimer, the term of this patent is extended or adjusted under 35 U.S.C. 154(b) by 793 days.

(21) Appl. No.: 17/216,643

(22) Filed: Mar. 29, 2021

(65) Prior Publication Data

US 2021/0215917 A1    Jul. 15, 2021

Related U.S. Application Data

(63) Continuation of application No. PCT/CN2019/103483, filed on Aug. 30, 2019.

(30) Foreign Application Priority Data

Sep. 30, 2018  (CN) .......................... 201811161664.0

(51) Int. Cl.
  *G02B 15/14* (2006.01)
  *G02B 13/00* (2006.01)
  (Continued)

(52) U.S. Cl.
  CPC ..... *G02B 15/1451* (2019.08); *G02B 13/0045* (2013.01); *G02B 13/02* (2013.01); *G02B 15/177* (2013.01)

(58) Field of Classification Search
  CPC .............. G02B 15/145; G02B 15/1451; G02B 15/145129; G02B 13/0045
  (Continued)

(56) References Cited

U.S. PATENT DOCUMENTS 5,299,064 A   3/1994 Hamano et al.
6,327,100 B1  12/2001 Yamanashi
(Continued)

FOREIGN PATENT DOCUMENTS

CN  103676112 A   3/2014
CN  204694911 U  10/2015
(Continued)

OTHER PUBLICATIONS

International Search Report in PCT/CN2019/103483 mailed on Nov. 28, 2019, 5 pages.
(Continued)

*Primary Examiner* — Cara E Rakowski
*Assistant Examiner* — Jennifer A Jones
(74) *Attorney, Agent, or Firm* — METIS IP LLC (57) ABSTRACT

A zoom lens is provided. The zoom lens may include in order from an object side to an image side: a first lens group; a second lens group; a third lens group; a fourth lens group; and a fifth lens group; wherein the zoom lens satisfies the following conditions: $-1.7 \leq f_2/f_w \leq -0.3$, $0.7 \leq f_3/f_w \leq 2.1$, $1.1 \leq f_4/f_w \leq 2.5$, and $TTL/f_w \leq 6.5$, wherein $f_2$ denotes a focal length of the second lens group, $f_3$ denotes a focal length of the third lens group, $f_4$ denotes a focal length of the fourth lens group, $f_w$ denotes a focal length of the zoom lens, and TTL denotes a total track length of the zoom lens.

19 Claims, 9 Drawing Sheets

(51) Int. Cl.
  *G02B 13/02* (2006.01)
  *G02B 15/177* (2006.01)
(58) Field of Classification Search
  USPC .......................................................... 359/676
  See application file for complete search history.

(56) References Cited

U.S. PATENT DOCUMENTS

| | | | |
|---|---|---|---|
| 11,106,023 B2* | 8/2021 | Umeda | G02B 15/145113 |
| 2009/0208195 A1 | 8/2009 | Hatakeyama | |
| 2010/0033836 A1 | 2/2010 | Ohtake | |
| 2010/0134901 A1 | 6/2010 | Kimura | |
| 2011/0080650 A1* | 4/2011 | Nanba | G02B 13/18 359/683 |
| 2011/0249172 A1 | 10/2011 | Miyazawa | |
| 2012/0099208 A1* | 4/2012 | Peng | G02B 15/145113 359/683 |
| 2012/0212834 A1 | 8/2012 | Yoshida | |
| 2013/0100335 A1 | 4/2013 | Nanba | |
| 2015/0370052 A1* | 12/2015 | Abe | G02B 27/0062 359/683 |
| 2016/0147049 A1* | 5/2016 | Abe | G02B 15/145129 359/557 |
| 2016/0187627 A1 | 6/2016 | Abe | |
| 2017/0031141 A1 | 2/2017 | Tomioka et al. | |
| 2017/0261728 A1* | 9/2017 | Shibata | G02B 15/145113 |
| 2018/0267279 A1 | 9/2018 | Fujikura et al. | |

FOREIGN PATENT DOCUMENTS

| | | | |
|---|---|---|---|
| CN | 106125273 A | | 11/2016 |
| CN | 205880341 U | | 1/2017 |
| CN | 106772965 A | | 5/2017 |
| CN | 206362998 U | | 7/2017 |
| CN | 107045186 A | | 8/2017 |
| CN | 107632378 A | | 1/2018 |
| CN | 107656362 A | | 2/2018 |
| CN | 207408661 U | | 5/2018 |
| JP | 2014056055 A | | 3/2014 |
| JP | 2015210347 A | | 11/2015 |
| JP | 2016118737 A | | 6/2016 |
| JP | 2017142468 A | * | 8/2017 |
| WO | 2020063249 A1 | | 4/2020 |

OTHER PUBLICATIONS

Written Opinion in PCT/CN2019/103483 mailed on Nov. 28, 2019, 6 pages.
First Office Action in Chinese Application No. 201811161664.0 mailed on Sep. 16, 2019, 10 pages.
Herbert Gross et al., Handbook of Optical Systems-Aberration Theory and Correction of Optical Systems, Wiley, 2007, 34 pages.
Communication Pursuant to Article 94(3) EPC in European Application No. 19865130.9 mailed on Aug. 8, 2023, 6 pages.
Warren J. Smith, Modem Lens Design, McGraw-Hill, 1992, 5 pages.
The Extended European Search Report in European Application No. 19865130.9 mailed on Sep. 9, 2021, 9 pages.

* cited by examiner

Amended FIG. 6

Amended FIG. 7

ZOOM LENS AND OPTICAL DEVICE HAVING THE SAME

CROSS-REFERENCE TO RELATED APPLICATIONS

This application is a continuation of International Application No. PCT/CN2019/103483, filed on Aug. 30, 2019, which claims priority of Chinese Application No. 201811161664.0, filed on Sep. 30, 2018, the contents of which are incorporated herein in its entirety by reference.

TECHNICAL FIELD

The present disclosure generally relates to optical imaging technology, and more particularly, to zoom lenses and optical devices using the same.

BACKGROUND

With the developments of video surveillance and surveillance cameras, zoom lenses become more and more popular due to superior adaptability to complicated scenarios with their variable focal lengths. Existing zoom lenses usually have a large size in order to achieve high definition, even ultra high definition. However, such zoom lenses with large sizes cannot satisfy miniaturization requirements of the surveillance cameras, especially indoor surveillance cameras. For miniaturization, image planes of the zoom lenses usually have to become smaller, often resulting in low pixel resolution, poor imaging quality, and difficulty in human face recognition. Thus, it is desirable to provide zoom lenses with small sizes and high performances, for example, high pixel resolution, wide range angle, etc.

SUMMARY

An aspect of the present disclosure introduces a zoom lens including, in order from an object side to an image side: a first lens group; a second lens group; a third lens group; a fourth lens group; and a fifth lens group; wherein the zoom lens satisfies the following conditions:

$-1.7 \leq f_2/f_w \leq -0.3$ $0.7 \leq f_3/f_w \leq 2.1$ $1.1 \leq f_4/f_w \leq 2.5$, and $TTL/f_w \leq 6.5$ wherein $f_2$ denotes a focal length of the second lens group, $f_3$ denotes a focal length of the third lens group, $f_4$ denotes a focal length of the fourth lens group, $f_w$ denotes a focal length of the zoom lens, and TTL denotes a total track length of the zoom lens.

In some embodiments, the first lens group may have positive refractive power and include, in order from the object side to the image side: a first lens having negative refractive power, wherein the surface of the first lens facing the image side may be concave; a second lens having positive refractive power, wherein the second lens may be a biconvex lens; and a first lens unit including a third lens having positive refractive power.

In some embodiments, the third lens may be a meniscus lens, and the surface of the meniscus lens facing the object side may be convex.

In some embodiments, an Abbe number $Vd_{13}$ of the third lens may satisfy: $Vd_{13} \geq 66$.

In some embodiments, the second lens group may have negative refractive power and include, in order from the object side to the image side: a fourth lens having negative refractive power, wherein the fourth lens may be a meniscus lens and the surface of the fourth lens facing the image side may be concave; a fifth lens having negative refractive power, wherein the fifth lens may be a biconcave lens; and a sixth lens having positive refractive power, wherein the surface of the sixth lens facing the object side may be convex.

In some embodiments, the third lens group may have positive refractive power and include, in order from the object side to the image side: a second lens unit including a seventh lens having positive refractive power, wherein the seventh lens may be an aspherical lens; an eighth lens having negative refractive power, wherein the eighth lens may be a meniscus lens and the surface of the eighth lens facing the object side may be convex; a ninth lens having positive refractive power, wherein the ninth lens may be a biconvex lens; and a third lens unit including a tenth lens having negative refractive power.

In some embodiments, the tenth lens may be a biconcave lens, and the third lens unit further may include an eleventh lens having positive refractive power.

In some embodiments, the eleventh lens may be a meniscus lens, the surface of the eleventh lens facing the object side may be concave, and the tenth lens may be cemented with the eleventh lens to form a cemented doublet.

In some embodiments, the eighth lens and the ninth lens may form a first cemented lens group.

In some embodiments, a refractive index of the seventh lens may satisfy: $nd_{31} \geq 1.8$.

In some embodiments, an Abbe number of the ninth lens may satisfy: $Vd_{33} \geq 66$.

In some embodiments, a refractive index of the eleventh lens may satisfy: $nd_{34} \geq 1.9$.

In some embodiments, the fourth lens group may have positive refractive power and include, in order from the object side to the image side: a twelfth lens having positive refractive power, wherein the twelfth lens may be a biconvex lens; and a thirteenth lens having negative refractive power, wherein the surface of the thirteenth lens facing the object side may be concave.

In some embodiments, the twelfth lens and the thirteenth lens may form a second cemented lens group.

In some embodiments, the fifth lens group may include a fourteenth lens having positive refractive power.

In some embodiments, the fourteenth lens may be an aspherical lens.

In some embodiments, the zoom lens may further include an aperture stop between the second lens group and the third lens group.

In some embodiments, the zoom lens may further include an optical filter.

According to another aspect of the present disclosure, an optical device is provided. The optical device may include a zoom lens according to the present disclosure.

In some embodiments, the optical device may further include an image pickup device, wherein the zoom lens may guide light from an object to the image pickup device.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawing(s), all of which form part of this specification. It is to be expressly understood, however, that the drawing(s) is for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

An aspect of the present disclosure relates to zoom lenses with small sizes, large image planes, large apertures, and high resolutions. To this end, the zoom lenses may include fourteen optical lenses with particular shapes and structures. The fourteen optical lenses may be arranged in a certain order from an object side to an image side. Each of the fourteen optical lenses may have a certain refractive power. The zoom lenses may also use aspherical lenses and suitable optical materials to make the structure, parameters (e.g., the refractive index, the Abbe number, etc.) of the zoom lenses satisfy imaging conditions. In this way, the performances of the zoom lenses, such as the spherical aberration, the coma, the astigmatism, the field curvature, the lateral chromatic aberration, the axial chromatic aberration, etc., may be calibrated to realize small sizes, large image planes, large apertures, and high resolutions. The zoom lenses of the present disclosure may perform well in low-light environments, and the structures and sizes of the zoom lenses may match with the performances of the zoom lenses. The zoom lenses of the present disclosure may be widely used in video surveillance fields, and especially in face recognitions of intelligent cameras.

Figure 1:
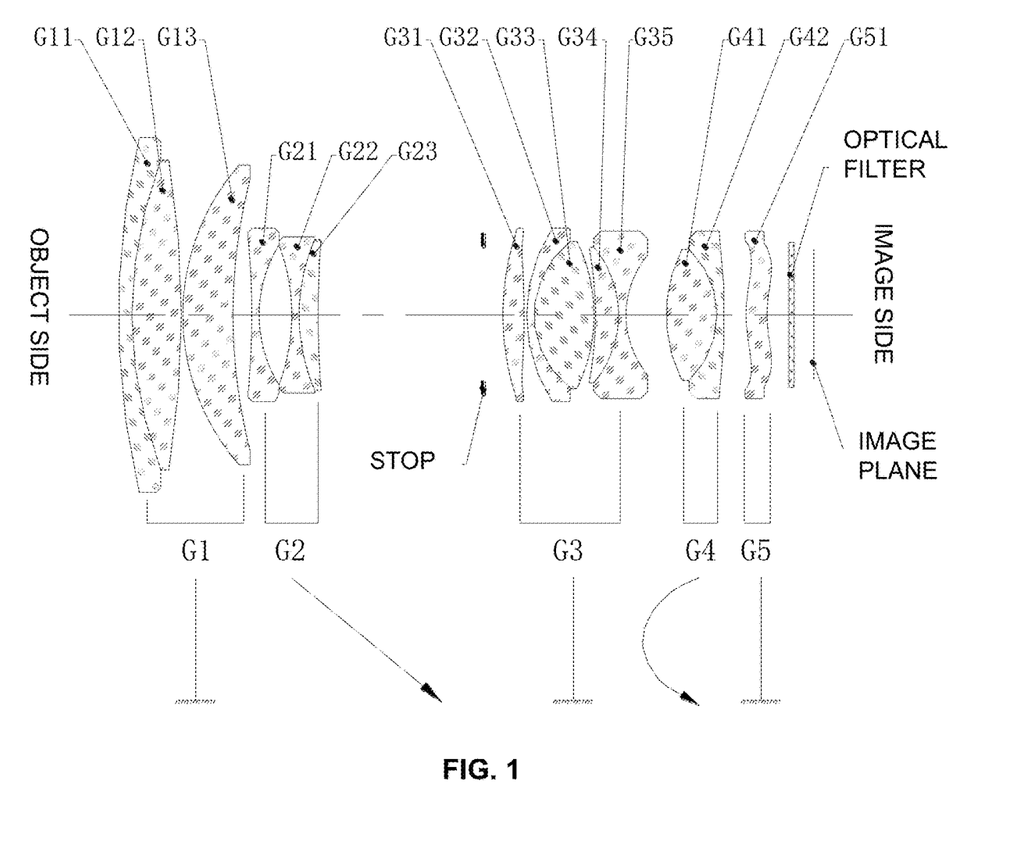
FIG. 1 is a cross-sectional view of an exemplary zoom lens according to some embodiments of the present disclosure.

FIG. 1 is a cross-sectional view of an exemplary zoom lens according to some embodiments of the present disclosure. In some embodiments, the zoom lens may include an object side and an image side at two ends of the zoom lens, respectively. In some embodiments, in order from the object side to the image side, the zoom lens may include a first lens group G1, a second lens group G2, an aperture stop, a third lens group G3, a fourth lens group G4, a fifth lens group G5, an optical filter, and an image plane. In some embodiments, the zoom lens may satisfy the following four conditions:

$$-1.7 \le f_2/f_w \le -0.3 \tag{1},$$

$$0.7 \le f_3/f_w \le 2.1 \tag{2},$$

$$1.1 \le f_4/f_w \le 2.5 \tag{3},$$

$$TTL/f_w \le 6.5 \tag{4},$$

wherein $f_2$ denotes a focal length of the second lens group G2, $f_3$ denotes a focal length of the third lens group G3, $f_4$ denotes a focal length of the fourth lens group G4, $f_w$, denotes a focal length of the zoom lens at a wide angle end (short focal length), and TTL denotes a total track length of the zoom lens.

In some embodiments, the first lens group G1 may have positive refractive power. In some embodiments, the first lens group G1 may include a plurality of lenses. For example, in order from the object side to the image side, the first lens group G1 may include a first lens G11, a second lens G12, and a first lens unit.

In some embodiments, the first lens G11 may have negative refractive power. The surface of the first lens G11 facing the image side is concave. In some embodiments, the surface of the first lens G11 facing the object side may be flat, convex, or concave. For example, as shown in FIG. 1, the surface of the first lens G11 facing the object side may be convex.

In some embodiments, the second lens G12 may be a biconvex lens having positive refractive power. In some embodiments, in order to reduce the size of the first lens group G1 and the size of the zoom lens, as shown in FIG. 1, the first lens G11 and the second lens G12 may be cemented to form a cemented lens group.

In some embodiments, the first lens unit may include at least one third lens G13 having positive refractive power. In some embodiments, the third lens G13 may be a lens of any shape. For example, the first lens unit may only include one third lens G13. The third lens G13 may be a meniscus lens having positive refractive power. As shown in FIG. 1, the surface of the meniscus lens facing the object side may be convex, and the surface of the meniscus lens facing the image side may be concave. In some embodiments, an Abbe number $Vd_{13}$ of the third lens G13 may satisfy: $Vd_{13} \geq 66$.

In some embodiments, the second lens group G2 may have negative refractive power. In some embodiments, the second lens group G2 may include a plurality of lenses. For example, in order from the object side to the image side, the second lens group G2 may include a fourth lens G21, a fifth lens G22, and a sixth lens G23.

In some embodiments, the fourth lens G21 may have negative refractive power. In some embodiments, the fourth lens G21 may be a meniscus lens and the surface of the meniscus lens facing the image side may be concave.

In some embodiments, the fifth lens G22 may have negative refractive power. In some embodiments, the fifth lens G22 may be a biconcave lens.

In some embodiments, the sixth lens G23 may have positive refractive power. In some embodiments, the surface of the sixth lens G23 facing the object side may be convex. In some embodiments, the surface of the sixth lens G23 facing the image side may be flat, convex, or concave. For example, as shown in FIG. 1, the surface of the sixth lens G23 facing the image side may be flat. In some embodiments, in order to reduce the size of the second lens group G2 and the size of the zoom lens, as shown in FIG. 1, the fifth lens G22 and the sixth lens G23 may be cemented to form a cemented lens group.

In some embodiments, the third lens group G3 may have positive refractive power. In some embodiments, the third lens group G3 may include a plurality of lenses. For example, in order from the object side to the image side, the third lens group G3 may include a second lens unit, an eighth lens G32, a ninth lens G33, and a third lens unit.

In some embodiments, the second lens unit may at least include a seventh lens G31 having positive refractive power.

In some embodiments, the seventh lens G31 may be an aspherical lens having positive refractive power. In some embodiments, a refractive index $nd_{31}$ of the seventh lens G31 may satisfy: $nd_{31} \geq 1.8$.

In some embodiments, the eighth lens G32 may have negative refractive power. In some embodiments, the eighth lens G32 may be a meniscus lens. As shown in FIG. 1, the surface of the meniscus lens facing the object side may be convex, and the surface of the meniscus lens facing the image side may be concave.

In some embodiments, the ninth lens G33 may have positive refractive power. In some embodiments, the ninth lens G33 may be a biconvex lens. In some embodiments, in order to reduce the size of the third lens group G3 and the size of the zoom lens, as shown in FIG. 1, the eighth lens G32 and the ninth lens G33 may be cemented to form a cemented lens group. In some embodiments, an Abbe number $Vd_{33}$ of the ninth lens G33 may satisfy: $Vd_{33} \geq 66$.

In some embodiments, the third lens unit may at least include a tenth lens having negative refractive power. In some embodiments, in order from the object side to the image side, the third lens unit may include an eleventh lens G34 and the tenth lens G35. In some embodiments, the eleventh lens G34 may be a meniscus lens having positive refractive power. In some embodiments, the tenth lens G35 may be a biconcave lens having negative refractive power. The surface of the meniscus lens facing the object side may be concave. In some embodiments, the meniscus lens (the eleventh lens G34) may be cemented with the biconcave lens (the tenth lens G35) to form a cemented doublet. In some embodiments, a refractive index $nd_{34}$ of the eleventh lens G34 may satisfy: $nd_{34} \geq 1.9$.

In some embodiments, the fourth lens group G4 may have positive refractive power. In some embodiments, the fourth lens group G4 may include a plurality of lenses. For example, in order from the object side to the image side, the fourth lens group G4 may include a twelfth lens G41 and a thirteenth lens G42.

In some embodiments, the twelfth lens G41 may have positive refractive power. In some embodiments, the twelfth lens G41 may be a biconvex lens.

In some embodiments, the thirteenth lens G42 may have negative refractive power. In some embodiments, the surface of the thirteenth lens G42 facing the object side may be concave. In some embodiments, the surface of the thirteenth lens G42 facing the image side may be flat, concave, or convex. For example, as shown in FIG. 1, the surface of the thirteenth lens G42 facing the image side may be convex. In some embodiments, in order to reduce the size of the fourth lens group G4 and the size of the zoom lens, as shown in FIG. 1, the twelfth lens G41 may be cemented with the thirteenth lens G42 to form a cemented lens group.

In some embodiments, the fifth lens group G5 may at least include a fourteenth lens G51 having positive refractive power. In some embodiments, the fourteenth lens G51 may be an aspherical lens.

In some embodiments, at least one of the five lens groups of the zoom lens may be movable to change the focal lengths of the zoom lens. For example, the first lens group G1, the third lens group G3, and the fifth lens group G5 may be fixed, and the second lens group G2 and the fourth lens group G4 may be movable. For example, when changing focal lengths of the zoom lens, the second lens group G2 may be movable between the first lens group G1 and the third lens group G3 along the axis of the zoom lens. As another example, the fourth lens group G4 may be movable between the third lens group G3 and the fifth lens group G5 along the axis of the zoom lens. In some embodiments, both the second lens group G2 and the fourth lens group G4 may be moved along the axis of the zoom lens to change the focal length of the zoom lens. In some embodiments, only one of the second lens group G2 and the fourth lens group G4 may be moved along the axis of the zoom lens to change the focal length of the zoom lens.

In some embodiments, materials of the lenses of the zoom lens may include glass, plastic (e.g., PC, PMMA, etc.), quartz, crystal, or the like, or any combination thereof. For example, all of the fourteen lenses may be made up of glass. As another example, all of the fourteen lenses may be made up of plastic. As still another example, one or some of the fourteen lenses may be made up of glass, and others of the fourteen lenses may be made up of plastic.

In some embodiments, the zoom lens may include a plurality of parameters. For example, each surface of a lens in the zoom lens may have a radius of curvature R. As another example, a center thickness T may refer as a distance between two center points of two adjacent surfaces in the zoom lens. As still another example, each lens in the zoom lens may have a refractive index nd and an Abbe number Vd. In some embodiments, the radius of curvature R, the center thickness T, the refractive index nd, and the Abbe number Vd of each lens of the zoom lens may satisfy the conditions as shown in the following TAB. 1.

TABLE 1

| Surface Number | Radius of Curvature R (mm) | Center Thickness T (mm) | Refractive Index nd | Abbe Number Vd |
|---|---|---|---|---|
| 1 | 57.8832 | 1 | 1.847 | 23.79 |
| 2 | 31.90776 | 3.74 | 1.593 | 68.62 |
| 3 | −72.14314 | 1.4 | | |
| 4 | 17.16144 | 3.74 | 1.497 | 81.56 |
| 5 | 41.12845 | 1.4(W) 13(T) | | |
| 6 | −60.93739 | 0.55 | 1.717 | 47.92 |
| 7 | 10.105 | 2.44 | | |
| 8 | −14.90731 | 0.55 | 1.487 | 70.42 |
| 9 | 14.42406 | 1.42 | 2.0 | 25.46 |
| 10 | 70.357 | 12.3(W) 0.68(T) | | |
| STOP | Infinity | 1.52 | | |
| 12 | 18.60904 | 1.59 | 1.882 | 37.22 |
| 13 | −51.46148 | 0.19 | | |
| 14 | 12.08048 | 0.55 | 1.728 | 28.32 |
| 15 | 6.982865 | 4.48 | 1.593 | 68.62 |
| 16 | −12.55327 | 0.1 | | |
| 17 | −27.64438 | 1.77 | 2.0 | 19.32 |
| 18 | −7.778629 | 0.55 | 1.805 | 25.46 |
| 19 | 7.080524 | 3(W) 4(T) | | |
| 20 | 11.05615 | 3.8 | 1.593 | 68.62 |
| 21 | −6.877205 | 0.55 | 1.67 | 47.2 |
| 22 | −49.63489 | 1.5(W) 0.5(T) | | |
| 23 | Infinity | 0.1 | | |
| 24 | 10.88491 | 1.57 | 1.497 | 81.6 |
| 25 | 9.918263 | 0.59 | | |
| 26 | Infinity | 0.4 | 1.517 | 64.21 |
| 27 | Infinity | 2.5 | | |
| IMA | Infinity | | | | wherein the surface number denotes a number of a surface of a lens in sequence from the object side to the image side. For example, as shown in FIG. 1, the surface number 1 may refer to the surface of the first lens G11 facing the object side. As another example, the surface number 2 may refer to the cemented surface of the first lens G11 and the second lens G12. As still another example, the surface number STOP and IMA may refer to the surface of the aperture stop and the image plane, respectively.

In some embodiments, each lens in the zoom lens may be designed according to the parameters as shown in TAB. 1. Taking the first lens G11 for example, the radius of curvature R of the surface of the first lens G11 facing the object side (the surface number 1) is 57.8832 mm, the refractive index nd of the surface number 1 is 1.847, and the Abbe number vd of the surface number 1 is 23.79. The radius of curvature R of the surface of the first lens G11 facing the image side (the surface number 2) is 31.90776 mm, the refractive index nd of the surface number 2 is 1.593, and the Abbe number vd of the surface number 1 is 68.62. The center thickness T between the surface of the first lens G11 facing the object side (the surface number 1) and the surface of the first lens G11 facing the image side (the surface number 2) is 1 mm. As shown in FIG. 1, the first lens G11 is cemented to the second lens G12 to form the cemented lens group, so the radius of curvature R, the refractive index nd, and the Abbe number Vd of the surface of the second lens G12 facing the object side (the surface number 2) are the same as that of the surface of the first lens G11 facing the image side (the surface number 2), respectively.

The word "W" in TAB. 1 denotes a short focal length (at wide angle end) state, and the word "T" denotes a long focal length (at telephoto end) state. For example, under the short focal length (at wide angle end) state, the distance between the surface of the third lens G13 facing the image side and the surface of the fourth lens G21 facing the object side is 1.4 mm. As another example, under the long focal length (at telephoto end) state, the surface of the third lens G13 facing the image side and the surface of the fourth lens G21 facing the object side is 13 mm.

It should be noted that the conditions in TAB. 1 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

As shown in FIG. 1, the seventh lens G31 and the fourteenth lens G51 may be aspherical lenses. As shown in TAB. 1, the surface number 12 and the surface number 13, which are the two surfaces of the seventh lens G31, are aspherical. The surface number 24 and the surface number 25, which are the two surfaces of the fourteenth lens G51, are aspherical. The parameters representing shapes of an aspherical lens may include a rise of arch Z, a caliber Y, the radius of curvature R, a cone coefficient K, the coefficients $A_4$, $A_6$, $A_8$, $A_{10}$, $A_{12}$, $A_{14}$, and $A_{16}$, etc. The relationship of the parameters may be represented as Equation (1):

$$Z = \left[\left(\frac{1}{R}\right)^2 * Y\right] \bigg/ \left\{1 + \left[1 - (1+k)*\left(\frac{1}{R}\right)^2 * Y_2\right]^{\frac{1}{2}}\right\} + \\ A_4 Y_4 + A_6 Y_6 + A_8 Y_8 + A_{10} Y_{10} + A_{12} Y_{12} + A_{14} Y_{14} + A_{16} Y_{16}, \quad (1)$$

In some embodiments, the surface (the surface number 12) of the seventh lens G31 facing the object side may have the following parameters:

$K=-2.602$;

$A_4=-5.78861e-005$;

$A_6=2.42562e-007$;

$A_8=5.46587e-008;$ $A_{10}=-1.81631e-009;$ $A_{12}=1.07784e-010;$ $A_{14}=-1.65747e-012;$ and $A_{16}=-7.08994e-015.$ In some embodiments, the surface (the surface number 13) of the seventh lens G31 facing the image side may have the following parameters:

$K=62.94;$ $A_4=0.000121095;$ $A_6=2.11454e-006;$ $A_8=1.32797e-007;$ $A_{10}=-5.76667e-009;$ $A_{12}=3.29538e-010;$ $A_{14}=-6.78042e-012;$ and $A_{16}=4.62782e-014.$ In some embodiments, the surface (the surface number 24) of the fourteenth lens G51 facing the object side may have the following parameters:

$K=-18.38712;$ $A_4=0.000587833;$ $A_6=-0.000135562;$ $A_8=7.91767e-006;$ $A_{10}=-3.14664e-007;$ $A_{12}=1.29295e-009;$ $A_{14}=3.40305e-010;$ and $A_{16}=-7.40163e-012.$ In some embodiments, the surface (the surface number 25) of the fourteenth lens G51 facing the image side may have the following parameters:

$K=-23.09146;$ $A_4=0.00123511;$ $A_6=-0.000306079;$ $A_8=2.26056e-005;$ $A_{10}=-1.16892e-006;$ $A_{12}=3.28412e-008;$ $A_{14}=-2.97189e-010;$ and $A_{16}=-2.00999e-012.$ It should be noted that the parameters of the seventh lens G31 and the fourteenth lens G51 are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

According to the zoom lens described in the present disclosure, the total track length TTL of the zoom lens may satisfy TTL≤52 mm. The focal length $f_{w'}$ at the wide angle end (short focal length) may be 10 mm, and the focal length $f_{w'}$ at the telephoto end (long focal length) may be 30 mm. The field angle of the zoom lens at the wide angle end (short focal length) may be 52°, and the field angle of the zoom lens at the telephoto end (long focal length) may be 16°. The field angle of the zoom lens may be between 16° and 52°. The optical distortion of the zoom lens at the wide angle end (short focal length) may be −9%, and the optical distortion of the zoom lens at the telephoto end (long focal length) may be +2%. The aperture F/# of the zoom lens may be F1.5, and the aperture may be a fixed aperture. The size of the image plane of the zoom lens may be 1/1.8".

Figure 2:
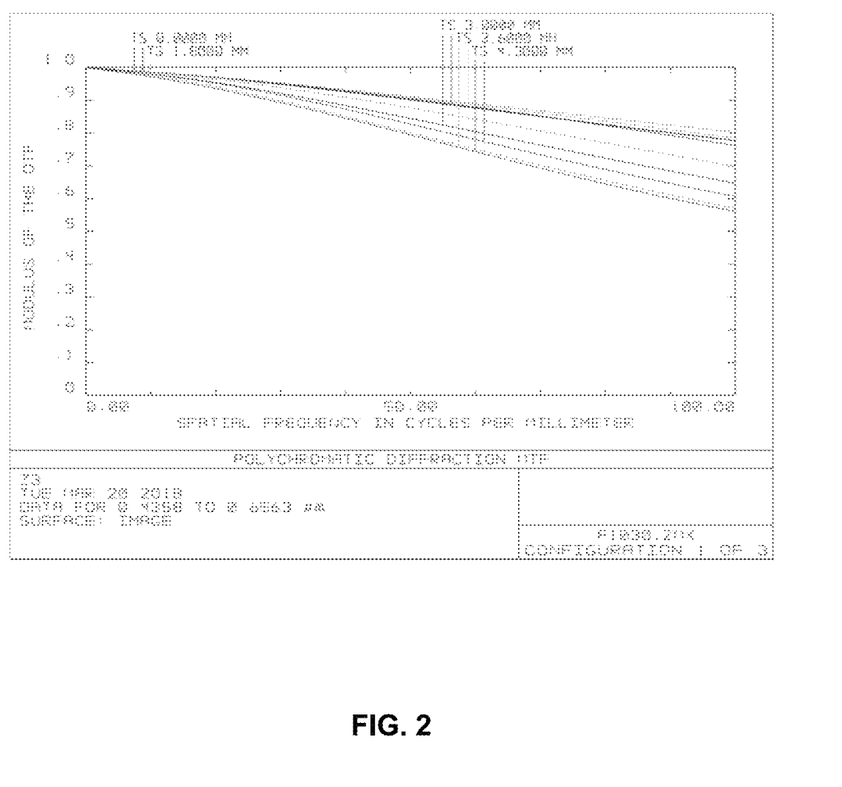
FIG. 2 is a diagram illustrating an exemplary modulation transfer function (MTF) of a zoom lens at a wide angle end (short focal length) according to some embodiments of the present disclosure.

FIG. 2 is a diagram illustrating an exemplary modulation transfer function (MTF) of a zoom lens at a wide angle end (short focal length) according to some embodiments of the present disclosure. In some embodiments, the MTF may be used to evaluate imaging qualities of a zoom lens. For example, the higher and smoother of the curve of the MTF, the higher imaging quality of the zoom lens. The aberrations, such as spherical aberration, the coma, the astigmatism, the field curvature, the lateral chromatic aberration, the axial chromatic aberration, etc., may be well calibrated. As shown in FIG. 2, the curve of the MTF of visible light at the wide angle end (short focal length) of the zoom lens is smooth and concentrated. The average value of the MTF of a full field (a half image height Y'=4.3 mm) may be greater than 0.65.

Figure 3:
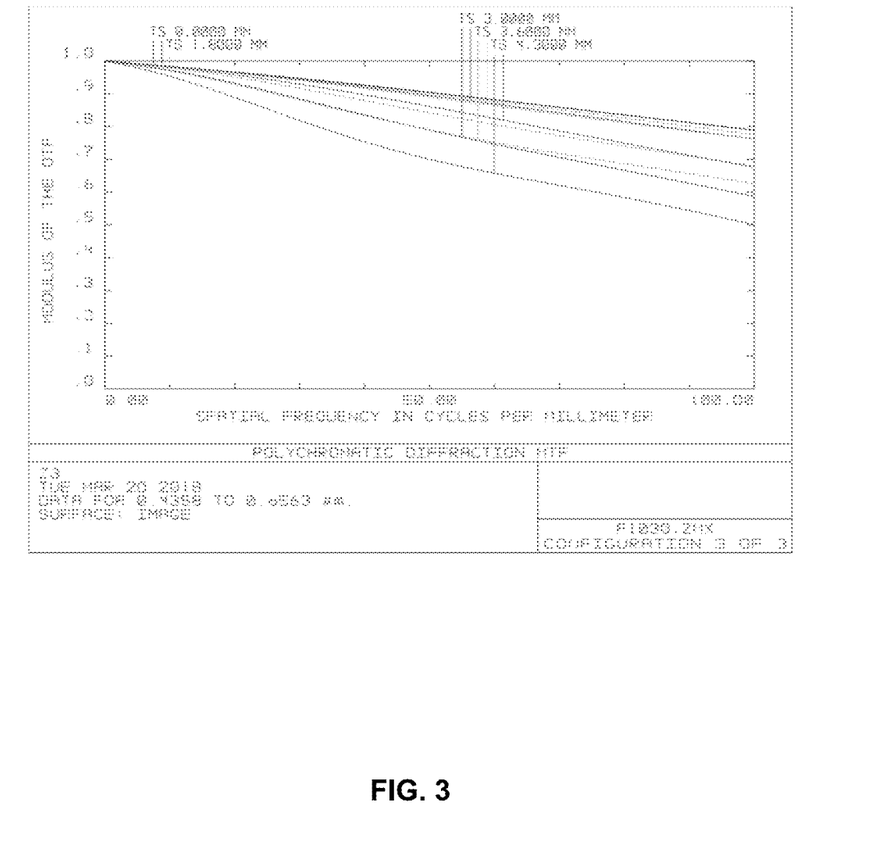
FIG. 3 is a diagram illustrating an exemplary modulation transfer function (MTF) of a zoom lens at a telephoto end (long focal length) according to some embodiments of the present disclosure.

FIG. 3 is a diagram illustrating an exemplary modulation transfer function (MTF) of a zoom lens at a telephoto end (long focal length) according to some embodiments of the present disclosure. As shown in FIG. 3, the curve of the MTF of visible light at the telephoto end (long focal length) of the zoom lens is smooth and concentrated. The average value of the MTF of the full field (the half image height Y'=4.3 mm) may be greater than 0.6. According to the zoom lens of the present disclosure, the resolution of the zoom lens is high, the image plane is 1/1.8", and the zoom lens satisfies 1200 megapixel.

Figure 4:
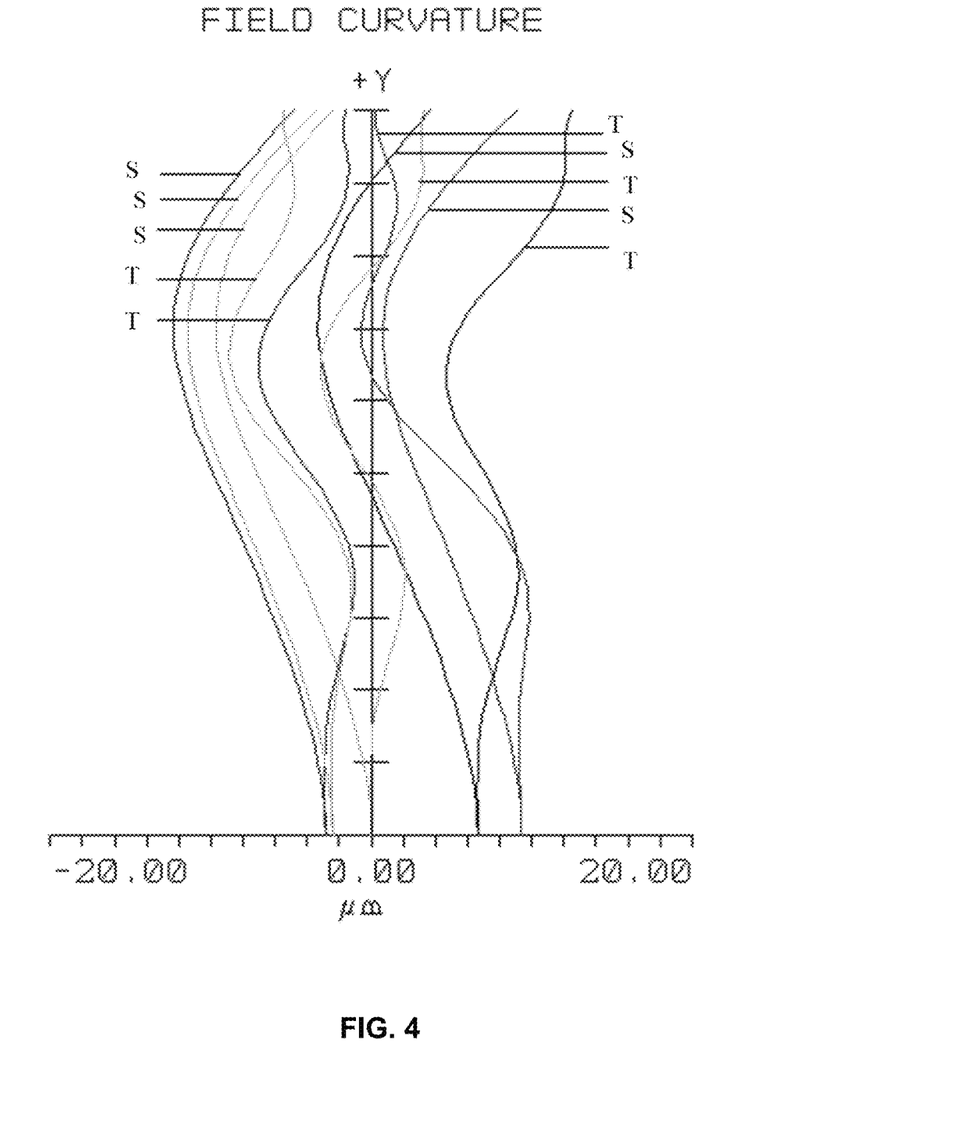
FIG. 4 is a diagram illustrating exemplary meridional field curvatures of a zoom lens at a wide angle end (short focal length) according to some embodiments of the present disclosure.
Figure 5:
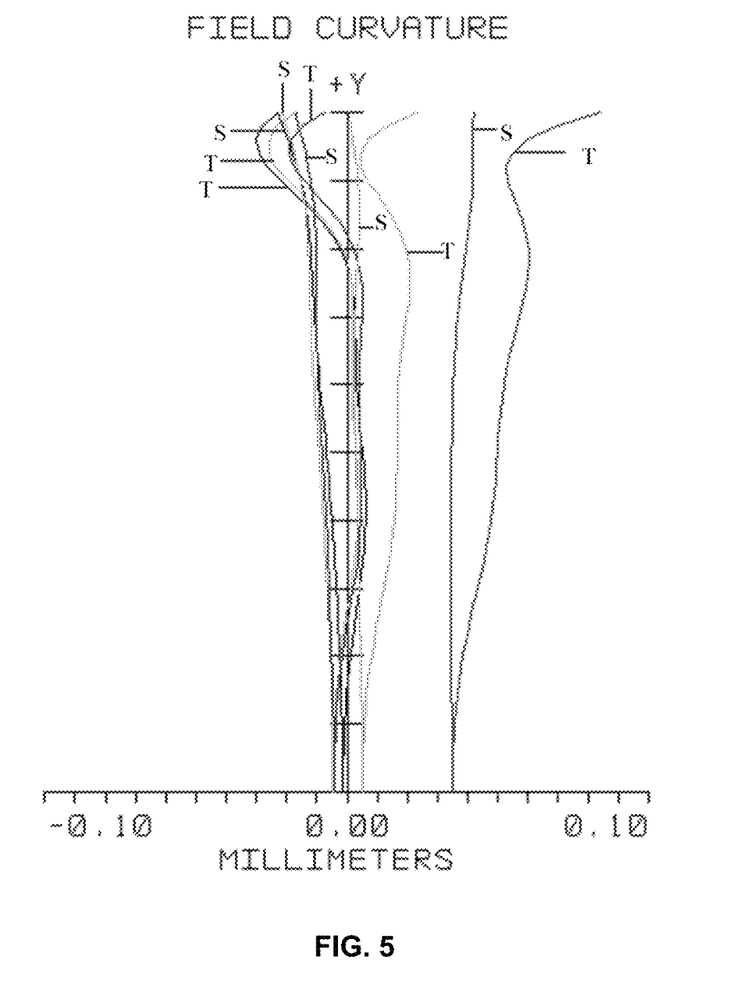
FIG. 5 is a diagram illustrating exemplary meridional field curvatures of a zoom lens at a telephoto end (long focal length) according to some embodiments of the present disclosure.

FIG. 4 is a diagram illustrating exemplary meridional field curvatures of a zoom lens at a wide angle end (short focal length) according to some embodiments of the present disclosure. FIG. 5 is a diagram illustrating exemplary meridional field curvatures of the visible light of a zoom lens at a telephoto end (long focal length) according to some embodiments of the present disclosure. In some embodiments, the meridional field curvatures of the zoom lens corresponding to the visible light may include three curves T and three curves S. The three curves T may represent aberrations of tangential rays corresponding to three wavelengths of 486 nm, 587 nm, and 656 nm, respectively. The three curves S may represent aberrations of sagittal rays corresponding to three wavelengths of 486 nm, 587 nm, and 656 nm, respectively. The less of the values of the meridional field curvature and the sagittal field curvature, the higher imaging quality of the zoom lens. As shown in FIG. 4, the values of the meridional field curvatures may be between −0.009 mm and 0.012 mm. As shown in FIG. 5, the values of the sagittal field curvatures may be between −0.025 mm and 0.042 mm.

Figure 6:
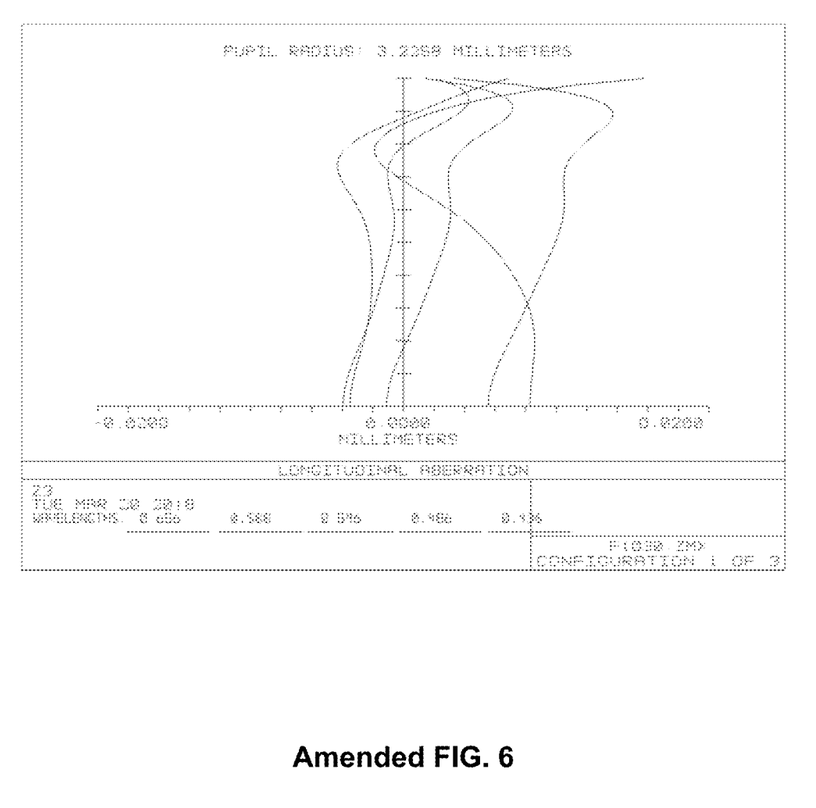
FIG. 6 is a diagram illustrating exemplary axial chromatic aberration of a zoom lens at a wide angle end (short focal length) according to some embodiments of the present disclosure.
Figure 7:
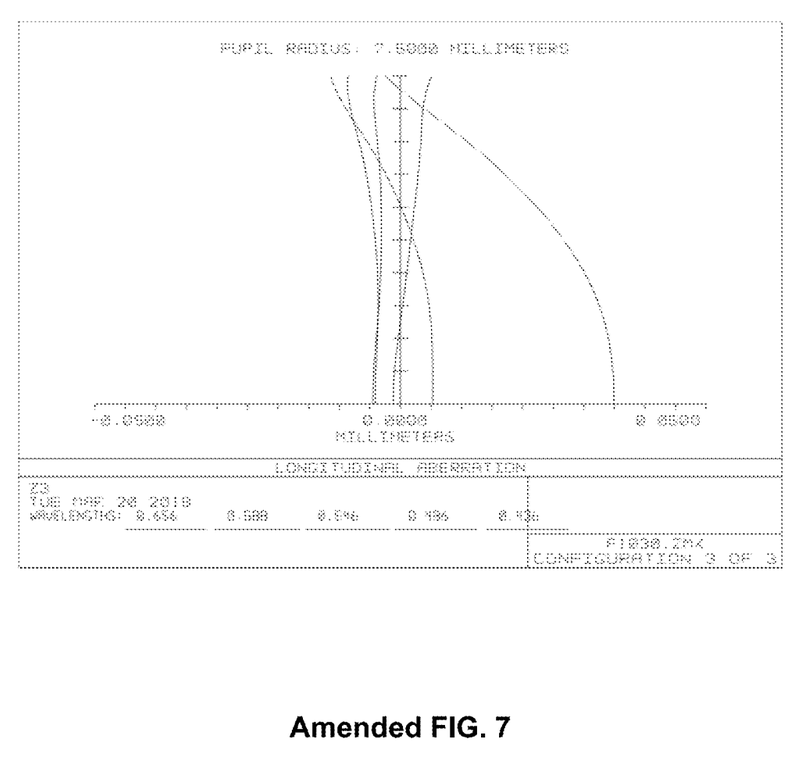
FIG. 7 is a diagram illustrating exemplary axial chromatic aberration of a zoom lens at a telephoto end (long focal length) according to some embodiments of the present disclosure.

FIG. 6 is a diagram illustrating exemplary axial chromatic aberration of the visible light of a zoom lens at a wide angle end (short focal length) according to some embodiments of the present disclosure. FIG. 7 is a diagram illustrating exemplary axial chromatic aberration of a zoom lens at a telephoto end (long focal length) according to some embodiments of the present disclosure. As shown in FIG. 6 and FIG. 7, the closer that the curves to the Y axis, the higher imaging quality of the zoom lens. As shown in FIG. 6, the axial chromatic aberrations of the zoom lens at the wide angle end (short focal length) may be between −0.004 mm and +0.0157 mm. As shown in FIG. 7, the axial chromatic aberrations of the zoom lens at the telephoto end (long focal length) may be between −0.011 mm and +0.035 mm.

Figure 8:
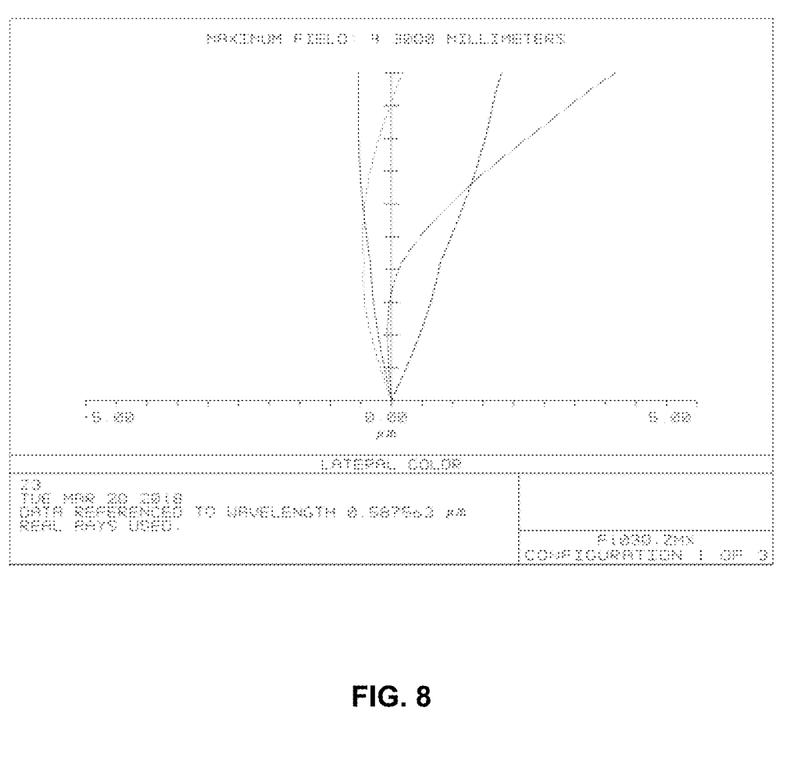
FIG. 8 is a diagram illustrating exemplary lateral chromatic aberration of a zoom lens at a wide angle end (short focal length) according to some embodiments of the present disclosure.
Figure 9:
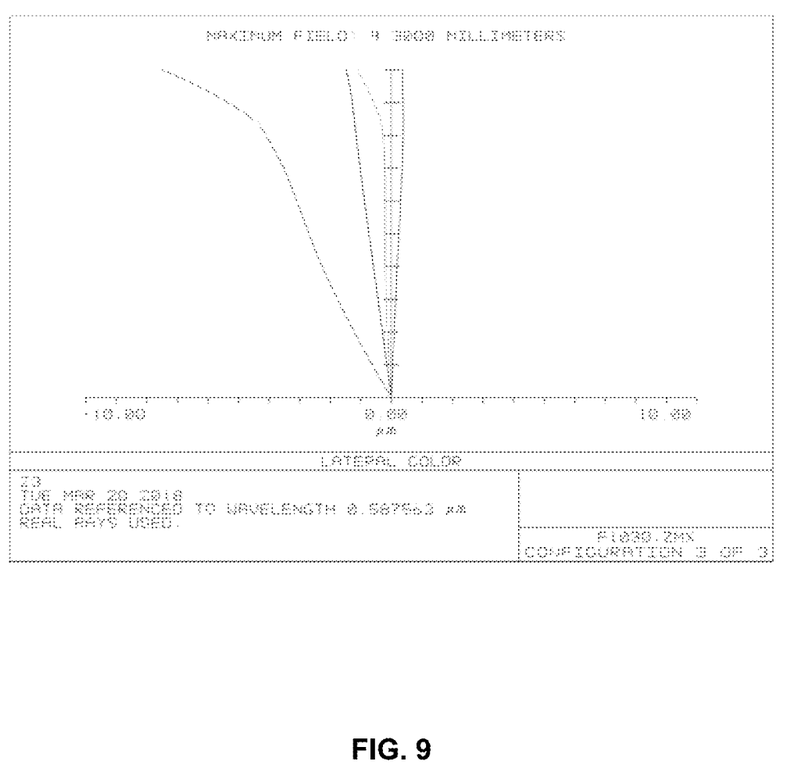
FIG. 9 is a diagram illustrating exemplary lateral chromatic aberration of a zoom lens at a telephoto end (long focal length) according to some embodiments of the present disclosure.

FIG. 8 is a diagram illustrating exemplary lateral chromatic aberration of the visible light of a zoom lens at a wide angle end (short focal length) according to some embodiments of the present disclosure. FIG. 9 is a diagram illustrating exemplary lateral chromatic aberration of the visible light of a zoom lens at a telephoto end (long focal length) according to some embodiments of the present disclosure. As shown in FIG. 8, the lateral chromatic aberrations of the zoom lens at the wide angle end (short focal length) may be between −0.00055 mm and +0.0037 mm. As shown in FIG. 9, the lateral chromatic aberrations of the zoom lens at the telephoto end (long focal length) may be between −0.0075 mm and +0.0004 mm.

In some embodiments, another aspect of the present disclosure relates to optical apparatuses having the zoom lenses described in the present disclosure. For example, an optical apparatus may include a zoom lens according to the present disclosure and an image pickup device. In some embodiments, the image pickup device may be at the image plane of the zoom lens. In some embodiments, the zoom lens may guide light from an object at the object side of the zoom lens to the image pickup device. In some embodiments, the image pickup device may convert an object image into electrical signals. For example, the image pickup device may include a CCD sensor, a CMOS sensor, or the like, or any combination thereof.

In some embodiments, the optical apparatus may be any electronic device that is capable of capturing images or videos. For example, the optical apparatus may include an image sensor, a video recorder, or the like, or any combination thereof. In some embodiments, the optical apparatus may include any suitable types of camera, such as a fixed camera, a fixed dome camera, a covert camera, a Pan-Tilt-Zoom (PTZ) camera, a thermal camera, or the like, or any combination thereof. In some embodiments, the optical apparatus may be implemented on a computing device or a mobile device.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment." or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine." "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 1703, Perl, COBOL 1702, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities or properties used to describe and claim certain embodiments of the application are to be understood as being modified in some instances by the term "about." "approximate." or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

We claim:

1. A zoom lens comprising, in order from an object side to an image side:
    a first lens group;
    a second lens group;
    a third lens group;
    a fourth lens group; and
    a fifth lens group, the fifth lens group including a fourteenth lens having positive refractive power, the fourteenth lens being an aspherical lens, and two surfaces of the fourteenth lens being aspherical;
    wherein the zoom lens satisfies the following conditions:

$-1.7 \leq f_2/f_w \leq -0.3$ $0.7 \leq f_3/f_w \leq 2.1$ $1.1 \leq f_4/f_w \leq 2.5$, and $TTL/f_w \leq 6.5$ wherein $f_2$ denotes a focal length of the second lens group, $f_3$ denotes a focal length of the third lens group, $f_4$ denotes a focal length of the fourth lens group, $f_w$, denotes a focal length of the zoom lens, and TTL denotes a total track length of the zoom lens.

2. The zoom lens of claim 1, wherein the first lens group has positive refractive power and includes, in order from the object side to the image side:
    a first lens having negative refractive power, wherein the surface of the first lens facing the image side is concave;
    a second lens having positive refractive power, wherein the second lens is a biconvex lens; and
    a first lens unit including a third lens having positive refractive power.

3. The zoom lens of claim 2, wherein the third lens is a meniscus lens, and the surface of the meniscus lens facing the object side is convex.

4. The zoom lens of claim 2, wherein an Abbe number $Vd_{13}$ of the third lens satisfies: $Vd_{13} \geq 66$.

5. The zoom lens of claim 1, wherein the second lens group has negative refractive power and includes, in order from the object side to the image side:
    a fourth lens having negative refractive power, wherein the fourth lens is a meniscus lens and the surface of the fourth lens facing the image side is concave;
    a fifth lens having negative refractive power, wherein the fifth lens is a biconcave lens; and
    a sixth lens having positive refractive power, wherein the surface of the sixth lens facing the object side is convex.

6. The zoom lens of claim 1, wherein the third lens group has positive refractive power and includes, in order from the object side to the image side:
    a second lens unit including a seventh lens having positive refractive power, wherein the seventh lens is an aspherical lens;
    an eighth lens having negative refractive power, wherein the eighth lens is a meniscus lens and the surface of the eighth lens facing the object side is convex;
    a ninth lens having positive refractive power, wherein the ninth lens is a biconvex lens; and
    a third lens unit including a tenth lens having negative refractive power.

7. The zoom lens of claim 6, wherein the tenth lens is a biconcave lens, and the third lens unit further includes an eleventh lens having positive refractive power.

8. The zoom lens of claim 7, wherein
the eleventh lens is a meniscus lens,
the surface of the eleventh lens facing the object side is concave, and
the tenth lens is cemented with the eleventh lens to form a cemented doublet.

9. The zoom lens of claim 6, wherein the eighth lens and the ninth lens form a first cemented lens group.

10. The zoom lens of claim 6, wherein a refractive index of the seventh lens satisfies: $nd_{31} \geq 1.8$.

11. The zoom lens of claim 6, wherein an Abbe number of the ninth lens satisfies: $Vd_{33} \geq 66$.

12. The zoom lens of claim 8, wherein a refractive index of the eleventh lens satisfies: $nd_{34} \geq 1.9$.

13. The zoom lens of claim 1, wherein the fourth lens group has positive refractive power and includes, in order from the object side to the image side:
a twelfth lens having positive refractive power, wherein the twelfth lens is a biconvex lens; and
a thirteenth lens having negative refractive power, wherein the surface of the thirteenth lens facing the object side is concave.

14. The zoom lens of claim 13, wherein the twelfth lens and the thirteenth lens form a second cemented lens group.

15. The zoom lens of claim 1, further comprising an aperture stop between the second lens group and the third lens group.

16. The zoom lens of claim 1, further comprising an optical filter.

17. An optical apparatus, comprising:
a zoom lens comprising, in order from an object side to an image side:
a first lens group;
a second lens group;
a third lens group;
a fourth lens group; and
a fifth lens group, the fifth lens group including a fourteenth lens having positive refractive power, the fourteenth lens being an aspherical lens, and two surfaces of the fourteenth lens being aspherical;
wherein the zoom lens satisfies the following conditions:

$-1.7 \leq f_2/f_w \leq -0.3$ $0.7 \leq f_3/f_w \leq 2.1$ $1.1 \leq f_4/f_w \leq 2.5$, and $TTL/f_w \leq 6.5$ wherein $f_2$ denotes a focal length of the second lens group, $f_3$ denotes a focal length of the third lens group, $f_4$ denotes a focal length of the fourth lens group, $f_w$, denotes a focal length of the zoom lens, and TTL denotes a total track length of the zoom lens.

18. The optical apparatus of claim 17, further comprising:
an image pickup device, wherein the zoom lens guides light from an object to the image pickup device.

19. The zoom lens of claim 1, wherein an average value of a modulation transfer function (MTF) of a full field at a wide angle end is greater than 0.65, and an average value of the MTF of the full field at a telephoto end is greater than 0.6.

* * * * *